US007966448B2

(12) United States Patent
Tamura et al.

(10) Patent No.: US 7,966,448 B2
(45) Date of Patent: Jun. 21, 2011

(54) STORAGE APPARATUS AND DATA WRITING METHOD

(75) Inventors: Keishi Tamura, Fujisawa (JP); Dai Taninaka, Odawara (JP)

(73) Assignee: Hitachi, Ltd., Tokyo (JP)

(*) Notice: Subject to any disclaimer, the term of this patent is extended or adjusted under 35 U.S.C. 154(b) by 756 days.

(21) Appl. No.: 12/044,114

(22) Filed: Mar. 7, 2008

(65) Prior Publication Data
US 2009/0193218 A1 Jul. 30, 2009

(30) Foreign Application Priority Data

Jan. 30, 2008 (JP) .................. 2008-018733

(51) Int. Cl.
*G06F 12/00* (2006.01)
(52) U.S. Cl. ........................................... 711/112
(58) Field of Classification Search .............. None
See application file for complete search history.

(56) References Cited

U.S. PATENT DOCUMENTS
2005/0091455 A1  4/2005 Kano et al.
2007/0078984 A1  4/2007 Abei FOREIGN PATENT DOCUMENTS
JP  2003-015915  1/2003
JP  2003-102374  4/2003
JP  2007-102439  4/2007

*Primary Examiner* — Brian R Peugh
(74) *Attorney, Agent, or Firm* — Antonelli, Terry, Stout & Kraus, LLP.

(57) ABSTRACT

A storage apparatus includes: a management unit for managing mapping, to a logical volume, of a second dynamically allocated storage area volume in an external storage apparatus, and also managing a management unit for a storage area in the second dynamically allocated storage area volume for storing data sent from the host computer; a volume creation unit for creating, when creating the first dynamically allocated storage area volume in accordance with an externally given command, the first dynamically allocated storage area volume by setting the management unit for the first dynamically allocated storage area volume based on a management unit for a storage area in the second dynamically allocated storage area volume; and a write data writing unit for writing, in accordance with a command from the host computer, the write data sent from the host computer to a storage area in a relevant second dynamically allocated storage area volume.

10 Claims, 11 Drawing Sheets

FIG.5

| VDEV NUMBER | SLOT NUMBER | PAGE NUMBER | INFORMATION ON OFFSET POSITION FROM PAGE HEAD |
|---|---|---|---|
| 0 | 0 | 0 | 0 |
| | 1 | 0 | 1 |
| | 2 | 0 | 2 |
| | 3 | 0 | 3 |
| | 4 | 3 | 0 |
| | ⋮ | ⋮ | ⋮ |
| 1 | 0 | 2014 | 0 |
| | 1 | 366 | 0 |
| | 2 | NOT ALLOCATED | - |
| | ⋮ | ⋮ | ⋮ |
| ⋮ | ⋮ | ⋮ | ⋮ |

| PAGE NUMBER | ALLOCATION DETERMINATION INFORMATION | EDEV NUMBER | INFORMATION ON OFFSET POSITION FROM HEAD POSITION IN EDEV |
|---|---|---|---|
| 0 | ALLOCATED | 36 | 0 |
| 1 | ALLOCATED | 37 | 1 |
| 2 | NOT ALLOCATED | 36 | 2 |
| ⋮ | ⋮ | ⋮ | ⋮ |

| | | | EXTERNAL DEVICE INFORMATION | | PATH INFORMATION | |
|---|---|---|---|---|---|---|
| EDEV NUMBER | DEVICE IDENTIFICATION INFORMATION | PAGE SIZE (MB) | CAPACITY (KB) | DEVICE TYPE | WWN | LUN |
| 0 | DRFGTFNEIEK | 42 | 657,456 | DISK | 0xAABBCCDD | 0 |
| 1 | ADRFGTFNEIE | 2 | 89,854 | DISK | 0xAABBEEFF | 3 |
| 2 | GGRRFFDDERT | 32 | - | TAPE | 0x445566AAB | 5 |
| 3 | AABBCCDDEE | 1 | 5,544,223 | DISK | 0x77DE12345 | 6 |
| | | | | | 0x77DE12345 | 3 |
| | | | | | 0x377DE7890 | 5 |
| 74A | 74B | 74C | 74D | 74E | 74F | 74G |

(74F and 74G rightmost rows: ALTERNATE PATH)

74

STORAGE APPARATUS AND DATA WRITING METHOD

CROSS-REFERENCES TO RELATED APPLICATIONS

This application relates to and claims priority from Japanese Patent Application No. 2008-018733, filed on Jan. 30, 2008, the entire disclosure of which is incorporated herein by reference.

BACKGROUND

The invention relates to a storage apparatus and a data writing method, for example, suitable for use in a storage system having a feature of dynamically allocating a storage area in a volume for storing data.

A storage system having a feature of dynamically allocating a storage area in a volume for storing data has conventionally been known, and various techniques relating to that feature have also been proposed.

For example, in JP2003-015915 A, the full capacity of physical volume to be provided to a host computer is not initially prepared, but a required physical disk is added if the disk usage approaches the upper limit of the capacity, thus dynamically varying the storage capacity provided to the host computer.

In the above mentioned storage system, that technique does not create, from a pool area, a logical volume of a fixed capacity, but firstly provides a virtual logical volume to the host computer. After that, in response to I/O (input/output) from the host computer, a storage area is dynamically allocated in predetermined units from a pool area, which is a physical source, to the virtual logical volume, thus dynamically expanding the capacity.

Meanwhile, a storage system having a virtualization feature where a higher-level storage apparatus is connected to an external storage apparatus to use the external storage apparatus as an internal storage device by mapping the external storage apparatus has also been known, and various techniques relating to that technique have been proposed too.

For example, in JP2007-102439 A, a storage area provided by the higher storage apparatus itself and a storage area provided by the external storage apparatus connected to the higher-level storage apparatus and used as an internal storage device are collectively managed by the higher-level storage apparatus, and data is read/written by having the higher-level storage apparatus sort data I/O requests from the host computer and sending them to a relevant external storage apparatus.

However, even if the external storage apparatus has the storage area dynamic allocation feature, the higher-level storage apparatus writes data to the internal storage devices, not taking into consideration the storage area dynamic allocation feature the external storage apparatus has.

Therefore, a storage area of too large a size with respect to the data to be written may be allocated to the internal storage device, and as a result, a wasteful area is generated in the storage area allocated to the internal storage device, so the storage area allocation is inefficient.

SUMMARY

The invention has been made in light of the above situation, and its object is to provide a storage apparatus and a data writing method capable of efficiently using storage areas.

To achieve the above object, the invention provides a storage apparatus for providing a host computer with a data write area where write data is written, the write area being a first dynamically allocated storage area volume that can be dynamically expanded by allocating a logical volume to the first dynamically allocated storage area volume, the apparatus comprising: a management unit for managing mapping, to the logical volume, of a second dynamically allocated storage area volume in an external storage apparatus, and also managing a management unit for a storage area in the second dynamically allocated storage area volume for storing data sent from the host computer; a first dynamically allocated storage area volume creation unit for creating, when creating the first dynamically allocated storage area volume in accordance with an externally given command, the first dynamically allocated storage area volume by setting a management unit for the first dynamically allocated storage area volume based on a management unit for a storage area in the second dynamically allocated storage area volume; and a write data writing unit for writing, in accordance with a command from the host computer, the write data sent from the host computer to a storage area in a relevant second dynamically allocated storage area volume.

The invention also provides a data writing method for a storage apparatus that provides a host computer with a data write area where write data is written, the data write area being a first dynamically allocated storage area volume that can be dynamically expanded by allocating a logical volume to the first dynamically allocated storage area volume, the method comprising: a first step of managing mapping, to the logical volume, of a second dynamically allocated storage area volume in an external storage apparatus, and also managing a management unit for a storage area in the second dynamically allocated storage area volume for storing data sent from a host computer; a second step of creating, when creating the first dynamically allocated storage area volume in accordance with an externally given command, the first dynamically allocated storage area volume by setting a management unit for the first dynamically allocated storage area volume based on a management unit for a storage area in the second dynamically allocated storage area volume; and a third step of writing, in accordance with a command from the host computer, the write data sent from the host computer to a storage area in a relevant second dynamically allocated storage area volume.

With that configuration, data is written to the first dynamically allocated storage area volume, taking into consideration the management unit for the second dynamically allocated storage area volume in the external storage apparatus. Accordingly, a wasteful, unused area can be efficiently prevented from being generated in the storage area in the second dynamically allocated storage area volume in the external storage apparatus allocated to the first dynamically allocated storage area volume.

The invention can realize a storage apparatus and a data writing method capable of efficiently using a storage area.

Other aspects and advantages of the invention will be apparent from the following description and the appended claims.

BRIEF DESCRIPTION OF THE DRAWINGS

FIG. 5 is a conceptual diagram illustrating a configuration for a VDEV management table.

FIG. 6 is a conceptual diagram illustrating a configuration for a page management table.

FIG. 7 is a conceptual diagram illustrating a configuration for a VDEV management table.

DETAILED DESCRIPTION OF PREFERRED EMBODIMENTS

An embodiment of the invention will be described below with reference to the drawings. However, the embodiment does not limit the invention.

Figure 1:
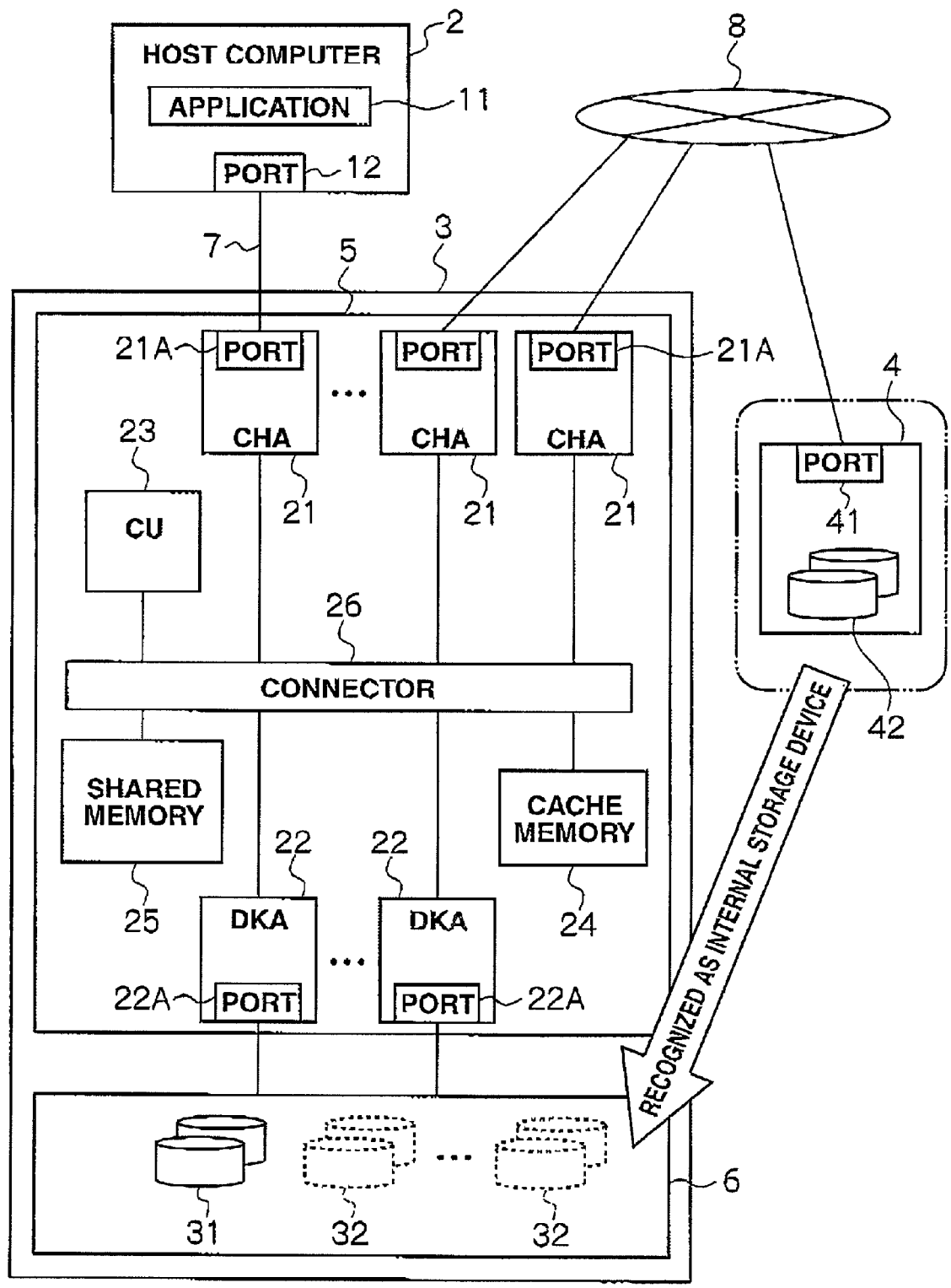
FIG. 1 is a block diagram showing a configuration of an embodiment of a storage system.

FIG. 1 is a block diagram showing the embodiment of the main part of the storage system 1.

The host computer 2 is a computer device having information processing resources such as a CPU (central processing unit) and memory, and examples of the host computer 2 include a personal computer, a workstation, and a mainframe. The host computer 2 has information input devices (not shown) such as a keyboard, a pointing device, and a microphone, and information output devices (not shown) such as a monitor display and a speaker. The host computer 2 is also provided with an application program 11 such as database software that uses a storage area provided by a first storage controller 3, and an adapter 12 for accessing the first storage controller 3 via a first communication network 7.

The host computer 2 is connected to the first storage controller 3 via the first communication network 7. A LAN, a SAN, the Internet, a dedicated line, or a public line, etc. may be used as appropriate as the first communication network 7, depending on the environment. If a LAN is used, data is communicated in accordance with, for example, TCP/IP (Transmission Control Protocol/Internet Protocol). If the host computer 2 is connected to the first storage controller 3 via a LAN, the host computer 2 requests data I/O in units of files by specifying a file name. Meanwhile, if the host computer 2 is connected to the first storage controller 3 or other components via a SAN, the host computer 2 requests data I/O in accordance with Fibre Channel protocol in units of blocks, which is a unit for managing data in a storage area provided by disk storage devices (disk drives). If the first communication network 7 is a LAN, the adapter 12 is, for example, a LAN-compatible network card. If the first communication network 7 is a SAN, the adapter 12 is, for example, a host bus adapter.

In FIG. 1, the host computer 2 is connected only to the first storage controller 3 via the first communication network 7, but the host computer 2 may also be connected to a second storage controller 4 via a second communication network 8. The second communication network 8 may be a SAN, a LAN, the Internet, a dedicated line, or a public line.

An example of the first storage controller 3 is a disk array subsystem. However, the first storage controller 3 is not limited to a disk array subsystem, and may be highly-functional intelligent-type Fibre Channel switch. As described later, the first storage controller 3 provides the host computer 2 with, as logical volumes (Logical Unit) in the first storage controller 3, storage resources included in the second storage controller 4. Therefore the first storage controller 3 does not have to have its own local storage devices.

The first storage controller 3 can be largely divided into a controller unit 5 and a storage unit 6, and the controller unit 5 includes, for example, plural channel adapters (CHA(s)) 21, plural disk adapters (DKA(s)) 22, a control unit (CU) 23, cache memory 24, shared memory 25, and a connector 26.

Each channel adapter 21 is used for data communication with the host computer 2. The channel adapter 21 has a communication port 21A for communicating with the host computer 2. The channel adapter 21 is a microcomputer system having a CPU and memory, and other components, and interprets and executes various commands received from the host computer 2. A network address (for example, IP address or WWN) is allocated to each channel adapter 21 to identify it and the channel adapters 21 can individually serve as NAS (Network Attached Storage). If plural host computers 2 exist, each channel adapter 21 can individually receive requests from each host computer 2.

Each disk adapter 22 is designed for sending/receiving data to/from storage devices 31 and 32 in the storage unit 6. The disk adapter 22 has a communication port 22A for connecting to the storage devices 31 and 32. Each disk adapter 22 is a microcomputer system including a CPU and memory, and other components. The disk adapter 22 writes, in accordance with a request (write command) from the host computer 2, data received by the channel adapter 21 from the host computer 2 to a relevant address in a relevant storage device 31 or 32, or reads, in accordance with a request (read command) from the host computer 2, data from a relevant address in a relevant storage device 31 or 32 and has the first storage controller 3 send the data to the host computer 2. If data is input to/output from the storage devices 31 and 32, the disk adapter 22 translates a logical address into a physical address. If the storage devices 31 and 32 are managed in a RAID (Redundant Array of Inexpensive Disks) configuration, the disk adapter 22 makes data access in accordance with the RAID configuration.

The control unit 23 controls overall operation in the apparatus. The control unit 23 is connected to, for example, a management console (not shown). The control unit 23 is designed for monitoring failure occurring in the apparatus and having the console display it, and ordering processing for blocking a storage disk in accordance with a command from the console.

The cache memory 24 temporarily stores data received from the host computer 2 or data read from the storage devices 31 and 32. The shared memory 25 stores control information or similar. A work area is set in the shared memory 25, and various tables such as an EDEV management table 74 and various programs are also stored. One or more of the storage devices 31 and 32 may be used as a cache disk.

A connector 26 connects each channel adapter 21, each disk adapter 22, the control unit 23, the cache memory 24, and the shared memory 25 to each other. An example of the connector 26 is a super high-speed cross bus switch that transmits data with high-speed switching.

The storage unit 6 includes plural storage devices 31. Examples of the storage devices 31 include a hard disk, a flexible disk, a magnetic tape, semiconductor memory, and an optical disk. The storage devices 32 indicated with a dotted line in the storage unit 6 are storage devices 42 included in the second storage controller 4 but incorporated in the first storage controller 3. More specifically, in this embodiment, the storage devices 42 external to the first storage controller 3 are recognized as internal storage devices (storage devices 32) in the first storage controller 3, and the first storage controller 3 provides the host computer 2 with storage resources in the external storage devices 42.

The second storage controller 4 has a communication port 41 and the storage devices 42. The second storage controller 41 may also have channel adapters and disk adapters, or other components, but the detailed configuration for the second storage controller 4 is not part of the gist of the invention, so the explanation has been omitted. The second storage controller 4 may have the same configuration as the configuration of the above described first storage controller 3. The second storage controller 4 is connected, via the communication network 8, to the first storage controller 3, and the storage devices 42 in the second storage controller 4 are handled as internal storage devices in the first storage controller 3.

Figure 2:
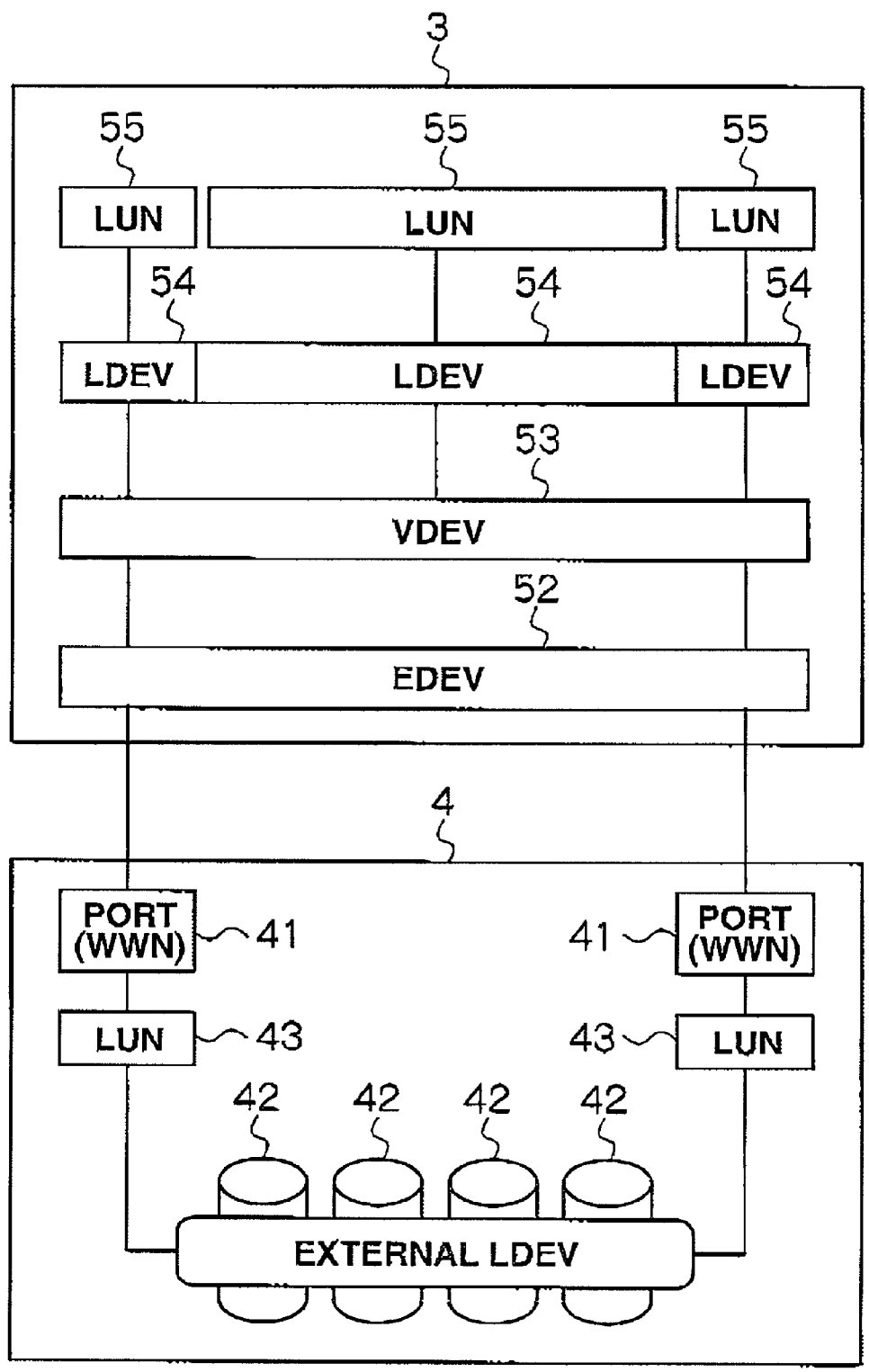
FIG. 2 is a conceptual diagram illustrating a schematic logical configuration (virtualization feature).

FIG. 2 is a schematic diagram showing a schematic logical configuration (virtualization feature) of the storage devices 32 in the first storage controller 3 and the storage devices 42 in the second storage controller 4. As shown in FIG. 2, the first storage controller 3 include, in ascending order from the lowermost stage, one or more EDEV(s) 52, VDEV(s) 53, LDEV(s) 54, and LUN(s) 55 that form a four-stage storage hierarchy. The second storage controller 4 has an LDEV (hereinafter referred to as an external LDEV 51) that is a logical volume.

The external LDEV 51 is formed by virtualizing the storage devices 42 in the second storage controller 4, and a RAID configuration may be utilized. In other words, plural VDEVs 51 may be formed from a single storage device 42 (slicing), or a single VDEV 51 may be formed from plural storage devices 31 (striping).

The external LDEV 51 has an alternate path configuration using plural paths. More specifically, an external LDEV 51 is built on the storage devices 42 and can be accessed via either of two paths (access data paths). A path extends from the first communication port 41A, via the LUN 43A, to the external LDEV 51, and the other path extends from the second communication port 41B, via another LUN 43B, to the external LDEV 51. Accordingly, even if either of the paths is unavailable due to failure or some reason, the external LDEV 51 can be accessed via the other path. If both paths are available for access to the external LDEV 51, necessary data protection is conducted to prevent data from being used via one path from being updated via the other path.

The details of the above configuration are not part of the gist of the invention, so the explanation has been omitted. However, the alternate path configuration is not limited to the above one, and may also have various intermediate stages in the storage hierarchy between the LDEV 51 and the storage device 42. The external LDEV 51 is a dynamically allocated storage area volume (described later).

The EDEV 52 is a virtual device at the lowermost stage of the logical storage hierarchy in the first storage controller 3. The EDEV 52 is formed by virtualizing the external LDEV 51. More specifically, in this embodiment, logical volumes (external LDEV(s) 51) provided by one or several storage device(s) 42 in the second storage controller 4 are mapped to the EDEV 52 using an EDEV management table 74 explained later, thus the logical volumes (external LDEV(s) 51) can be used as internal volumes in the first storage controller 3. The EDEV 52 can also be formed by virtualizing the storage device 31 in the first storage controller 3, but the details of that configuration are not part of the gist of the invention and the explanation has been omitted.

A VDEV 53 is provided at the stage one-level higher than the EDEV 62. The VDEV 53 is a virtual device at an intermediate stage in the logical storage hierarchy in the first storage controller 3. The VDEV 53 is formed by virtualizing the EDEV 52. More specifically, in this embodiment, one or more EDEV(s) 52 are mapped to the VDEV 53 using a VDEV management table 72 and a page management table 73 explained later, thus the EDEV(s) can be used as a logical volume. The VDEV 53 is a dynamically allocated storage area volume (described later).

LDEVs 54 are provided at the stage one-level higher than the VDEV 53. Each LDEV 54 is a logical device (logical volume) formed by virtualizing a virtual device (VDEV 53). One VDEV 53 may be connected to two LDEVs 54, and several VDEVs 53 may be connected to a single LDEV 54. The LDEV 54 can be accessed via each LUN 55. As described above, in this embodiment, each external storage device 42 can be used as one of the internal volumes in the first storage controller 3 by connecting the storage devices 42 to the intermediate-stage logical devices (external LDEV 51, EDEV 52, VDEV 53, LDEV 54) in the storage hierarchy provided between the LUNs 55 and the storage devices 42. The invention is not limited to that configuration, and a dynamically allocated storage area volume may be provided to the host computer 2.

In the FIG. 2 example, the first storage controller 3 uses the external LDEV 51 as the internal LDEV 54 by mapping storage resources (external LDEV 51) in the second storage controller 4 to the EDEV 52 in the first storage controller 3. Moreover, several LDEVs 54 are formed on a single VDEV 53, a single VDEV 53 is formed on a single EDEV 52, and the external LDEV 51 is mapped to that EDEV 52 via several paths. The host computer 2 recognizes only the LUNs 55 (but, as a result, also recognizes the LDEV 54), and the logical devices at the stages lower than the LUNs 55 cannot be seen from the host computer 2. The plural LDEVs 54 use the same single VDEV 53 and EDEV 52, and the EDEV 52 is connected to the same external LDEV 51 via plural paths. With that configuration, in the FIG. 2 example, the redundancy in the first storage controller 3 can be enhanced using the alternate path configuration in the second storage controller 4.

Figure 3:
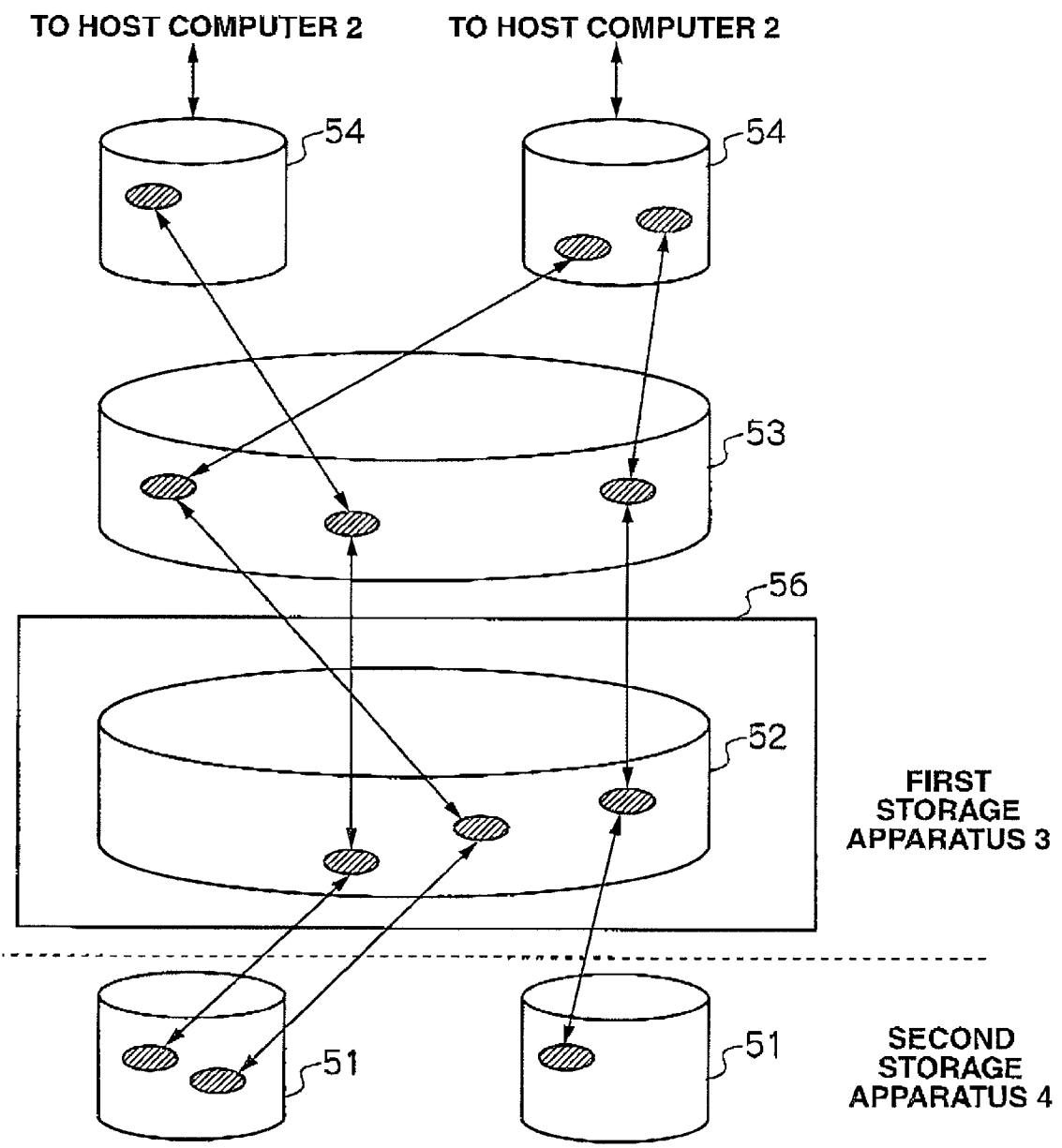
FIG. 3 is a conceptual diagram illustrating a schematic logical configuration (storage area dynamic allocation feature).

FIG. 3 is a diagram showing a schematic logical configuration (storage area dynamic allocation feature) of the an LDEV 52 in the first storage controller 3. As shown in FIG. 5, the first storage controller 3 includes the LDEVs 54 that are virtual logical volumes (virtual volumes) accessed by the host computer 2; the VDEV 53 that is a virtual volume (dynamically allocated storage area volume) mapped to the LDEV 54; the EDEV 52 that is an actual volume for storing data irrespective of the order of LBAs (Logical Block Address(es)) and mapped to the VDEV 53 (in actuality, the EDEV 52 is mapped to the external LDEV 51, and accordingly it is a virtual volume). A storage pool 56 is also formed with one or plural EDEV(s) 52.

The second storage controller 4 includes the external LDEV 51 that is a virtual volume (dynamically allocated storage area volume) mapped to the EDEV 52.

The storage area (virtual storage area) in the VDEV 53, which is a dynamically allocated storage area volume, is associated with the storage area (logical storage area) in the EDEV 52. The logical storage area in the EDEV 52 is associated with the storage area (virtual storage area) in the external LDEV 51, which is a dynamically allocated storage area volume. The virtual storage area in the external LDEV 51, which is, a dynamically allocated storage area volume, is associated with the storage area in the storage device 42 in the second storage controller 4 that is an actual storage area for actually storing data (described later). With that configuration, in the storage system 1, the LDEV 54 is provided to the host computer 2 and data sent from the host computer 2 can be stored in the actual storage area in the storage device 42 in the second storage controller 4.

In the VDEV 53, which is a dynamically allocated storage area volume, the storage area the storage pool 56 is allocated to is partitioned into predetermined areas (slots) and thus managed, and includes a storage pool allocated area, where the storage pool 56 is allocated, and a storage pool unallocated area, where the storage pool 56 is not allocated. After the first storage controller 3 receives a write request from the host computer 2, a storage area is provided to the VDEV 53, which is a dynamically allocated storage area volume, by dynamically allocating a virtual storage area (an actual storage area, which is a storage area in the storage device 42 for actually storing data) in the external LDEV 51 associated with the EDEV 52 in the storage pool 56.

Data sent from the host computer 2 is stored, in the order of data transmission from the host computer 2 and irrespective of LBAs, in a virtual storage area (an actual storage area that is a storage area in the storage device 42 for actually storing data) in the external LDEV 51 associated with the EDEV 52 in the storage pool 56.

In the storage pool 56, data sent from the host computer 2 is managed in units of page sizes, which are units for managing the storage pool 56 by partitioning the storage area in the storage pool 56 into predetermined areas (page(s)). With that configuration, a page size value can be set for each storage pool 56, and the storage pool 56 is allocated to a VDEV 53 in units of the pages (slot(s)).

The external LDEV 51, which is a dynamically allocated storage area volume, includes a storage pool allocated area where an actual storage area, which is a storage area in the storage device 42 for actually storing data, is allocated, and an unallocated area where no actual volume is allocated. A storage area is provided to the external LDEV 51, which is the dynamically allocated storage area volume, by dynamically allocating, in response to a write command from the first storage controller 3, a virtual storage area (an actual storage area that is the storage area in the storage device 42 for actually storing data) in the external LDEV 51 associated with the EDEV 52 in the storage pool 56.

Data sent from host computer 2 is stored, in the order of data transmission from the host computer 2 and irrespective of the order of LBAs, in the actual storage area that is the storage area in the storage device 42 associated with the external LDEV 51 for actually storing data.

In the external LDEV 51, data sent from the host computer 2 is managed in units of page sizes, which are units for managing the external LDEV 51 by partitioning the storage area in the external LDEV 51 in to predetermined areas (page(s)). With that configuration a page size value can be set for each external LDEV 51.

Figure 4:
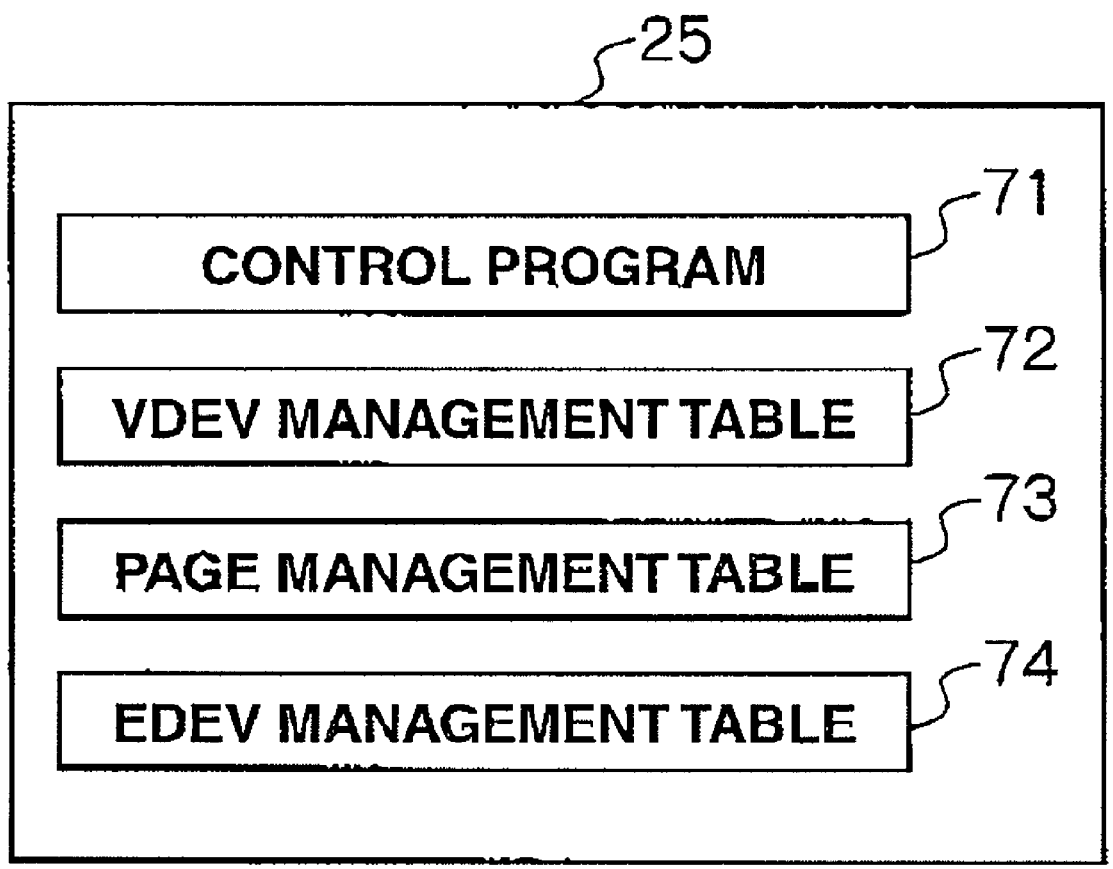
FIG. 4 is a conceptual diagram illustrating a program and various tables stored in shared memory 25.

FIG. 4 shows an example of a program and various tables stored in the shared memory 25. The shared memory 25 stores a control program 71, a VDEV management table 72, a page management table 73, and an EDEV management table 74. The control program 71 is a program for controlling the overall first storage controller 3, and the details will be described later.

FIG. 5 shows a configuration for the VDEV management table 72. The VDEV management table 72 is a table for mapping pages in the EDEV 52 in the storage pool 56 to the VDEV 52. The VDEV management table 72 contains VDEV number entries 72A for managing VDEV numbers for uniquely identifying each VDEV 53; slot number entries 72B for managing slot numbers for uniquely identifying each slot in the VDEV 53; page number entries 72C for managing page numbers for uniquely identifying each page in the EDEV 52 in the storage pool 56 allocated to a slot in the VDEV 53; and offset position information entries 72D for managing information about an offset position from the page head.

FIG. 6 shows a configuration for the page management table 73. The page management table 73 is a table for managing whether or not pages in the EDEV 52 in the storage pool 56 are allocated to slots in the VDEV 53. The page management table 73 contains page number entries 73A for managing page numbers for uniquely identifying each page in the EDEV 52 in the storage pool 56; allocation determination information entries 73B for managing information for determining whether or not each page is allocated to a slot in the VDEV 53; EDEV number entries 73C for managing EDEV numbers for uniquely identifying each EDEV 52 that has a storage area of a relevant page; and offset position information entries 73D for managing information about an offset position from the head position of a relevant EDEV 52.

FIG. 7 shows a configuration for the EDEV management table 74. The EDEV management table 74 is a table for mapping the external LDEV 51 in the second storage apparatus 4 to the EDEV 52. The EDEV management table 74 contains EDEV number entries 74A and external device information entries for managing information about external devices including the external LDEV 51 in the second storage apparatus 4.

The external device information entries are further divided into device identification information entries 74B for managing identification information on external devices; page size entries 74C for managing page sizes of storage devices 42 each allocated to an external device that is a dynamically allocated storage area volume; capacity entries 74D for managing the capacity of each external device; device type entries 74E for managing the device type (for example, tape device or disk device, or similar) of each external device; and path information entries for managing information about a path for each external device.

The path information entries are further divided into WWN entries 74F for managing WWNs which are identification information unique to each communication port 41, and LUN number entries 74G for managing LUN numbers each for uniquely identifying an LUN 43. Values for the device identification information and WWNs shown in FIG. 7 are used for reasons of convenience, and have no particular meaning. The EDEV 52 with EDEV number "3," shown in the lower part of FIG. 7, is associated with three path information entries. In other words, the storage device 42 allocated to the EDEV 52 (#3) has an alternate path structure including three paths, and this path structure is recognized to allocate that storage device 42 to the EDEV 52 (#3). It has been proven that the same storage area can be accessed via any of those three paths. Accordingly, even if failure occurs in one or two of the paths, desired data can be accessed via the remaining path.

Figure 8:
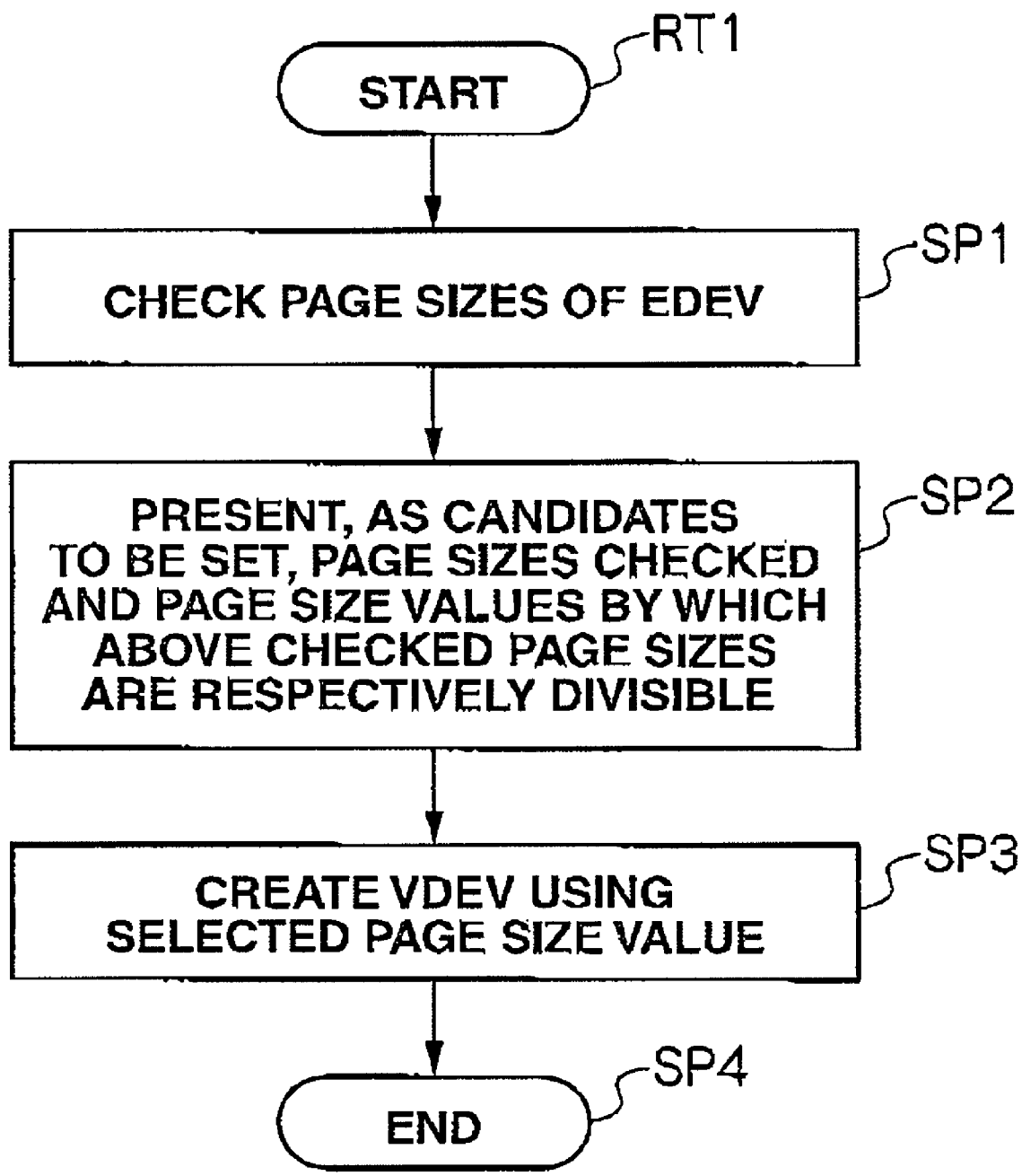
FIG. 8 is a flowchart showing a VDEV creation routine.

FIG. 8 is an example of a flowchart showing a specific routine of processing executed by each channel adapter 21 in the first storage apparatus 3, regarding creation of a VDEV 53 in the first storage apparatus 3 in the storage system 1.

After receiving a VDEV creation command from, for example, a user via a user operation unit (not shown) in the control unit 23, the channel adapter 21 in the first storage apparatus 3 runs the control program 71 and checks, in accordance with the VDEV creation routine RT1 shown in FIG. 8, the page sizes of EDEVs 52 by referring to a relevant page size entry 74C in the EDEV management table 74 (SP1).

After that, the channel adapter 21 in the first storage apparatus 3 has a user display unit (not shown) in the control unit 23 display, as candidates for the EDEV 52 in the storage pool 56 to be allocated to the VDEV 53, all page sizes checked and page size values that are divisible respectively by those checked page sizes (SP2).

After an EDEV 52 in the storage pool 56 to be allocated to the VDEV 53 is selected by a user from the user operation unit (not shown) in the control unit 23, the channel adapter 21 in the first storage apparatus 3 creates a VDEV 53 using a selected page size value (SP3).

After that, the channel adapter 21 in the first storage apparatus 3 terminates the VDEV creation routine RT1 shown in FIG. 8 (SP4).

Figure 9:
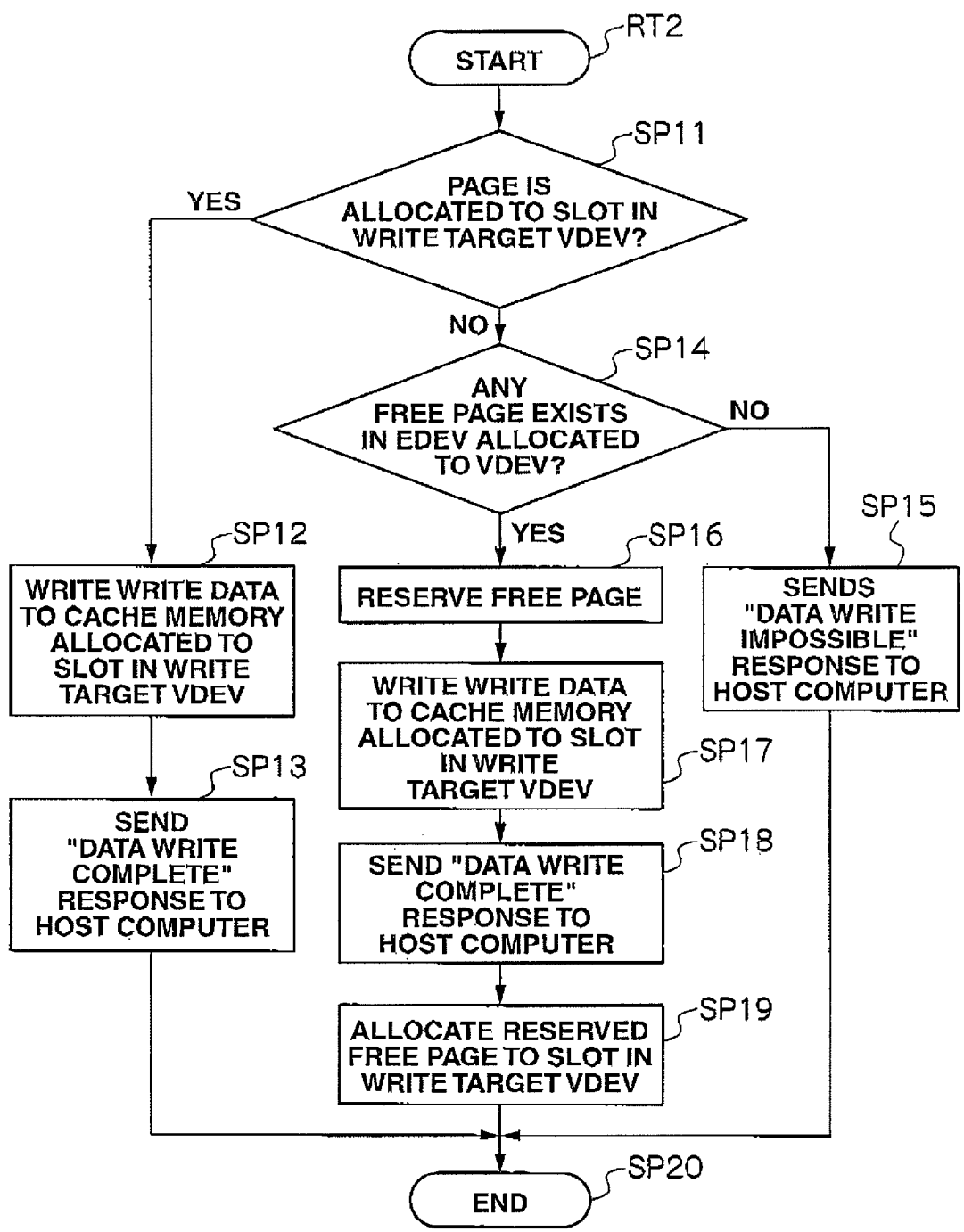
FIG. 9 is a flowchart showing a data write routine.

FIG. 9 is an example of a flowchart showing a specific routine of processing executed by the channel adapter 21 in the first storage apparatus 3, regarding processing for data writing in the first storage apparatus 3 in the storage system 1.

After receiving a write command from, for example, the host computer 2, the channel adapter 21 in the first storage apparatus 3 runs control program 71 and checks, in accordance with the data write routine RT2 shown in FIG. 9, by referring to the page number entries 72C in the VDEV management table 72, whether or not a page is allocated to a relevant slot in a write target VDEV (SP11).

If a page is allocated to the slot in the write target VDEV (SP11: YES), the channel adapter 21 in the first storage apparatus 3 writes write data to the cache memory 24 allocated to the slot in the write target VDEV (SP12).

After that, the channel adapter 21 in the first storage apparatus 3 sends a "data write complete" response to the host computer 2 (SP13), and terminates the data write routine RT2 shown in FIG. 9 (SP20).

Meanwhile, if no page is allocated to the slot in the write target VDEV (SP11; NO), the channel adapter 21 in the first storage apparatus 3 checks whether or not any free page remains in the EDEV 52 in the storage pool 56 allocated to the VDEV 53 by referring to the allocation determination information entries 73B and the EDEV number entries 73C in the page management table 72 (SP14).

If no free page exists in the EDEV 52 in the storage pool 56 allocated to the VDEV 53 (SP14: NO), the channel adapter 21 in the first storage apparatus 3 sends a "data write impossible" response to the host computer 2 (SP15), and terminates the data write routine RT2 shown in FIG. 9 (SP20).

Meanwhile, if a free page exists in the EDEV 52 in the storage pool 56 allocated to the VDEV 53 (SP14: YES), the channel adapter 21 in the first storage apparatus 3 reserves the free page (SP16).

After that, the channel adapter 21 in the first storage apparatus 3 writes write data to the cache memory 24 allocated to the slot in the write target VDEV 53 (SP17).

Then the channel adapter 21 in the first storage apparatus 3 sends a "data write complete" response to the host computer 2 (SP18).

After that, the channel adapter 21 in the first storage apparatus 3 allocates the above reserved free page to the slot in the VDEV 53 (SP19).

Then the channel adapter 21 in the first storage apparatus 3 terminates the data write routine RT2 shown in FIG. 9 (SP20).

After that, the channel adapter 21 in the first storage apparatus 3 refers to the EDEV management table 74 and sends the write data to a relevant external LDEV 51 in the second storage apparatus 4 not during the above processing, and the second storage apparatus 2 writes the write data to a relevant storage device 42.

As described above, in the storage system 1, when mapping external LDEVs 51 in the second storage apparatus, the first storage apparatus 3 acquires page sizes of those external LDEVs 51 and performs the mapping, and manages the mapping in the EDEV management table 74 to recognize the page sizes or page boundaries of the external LDEVs 51. In the storage system 1, the first storage apparatus 3 creates a VDEV 53 based on the page size of the relevant external LDEV 51 and writes, to the thus created VDEV, write data sent from the host computer.

In the storage system 1, if the VDEV 53 in the first storage apparatus 3 is managed using a page size smaller than the page size in the external LDEV 51 in the second storage apparatus 4, the page size in the external LDEV 51 in the second storage apparatus 4 is checked, and a page in the EDEV 52 in the storage pool 56 is allocated to the VDEV 53 in the first storage apparatus 3 so that several pages of the page size in the VDEV 53 in the first storage apparatus 3 correspond to a single page in the external LDEV 51 in the second storage apparatus.

For example, if the page size of the external LDEV 51 in the second storage apparatus 4 is 1 MB (MByte) and the page size of the VDEV 53 in the first storage apparatus 3 is 256 KB (KByte), 4 pages (256 KB×4 pages) in the VDEV 53 in the first storage apparatus 3, which correspond to a single page (1 MB×1 page) in the external LDEV 51 in the second storage apparatus 4, are allocated to a single page in the external LDEV 51 in the second storage apparatus 4.

In that way, in the storage system 1, write data is written to the VDEV 53 in the first storage apparatus 3, taking into consideration the page sizes in external LDEVs 51, which are dynamically allocated storage area volumes in the second storage apparatus 4. Accordingly, unnecessary, unused area can be effectively prevented from being generated in an external LDEV 51 (an actual storage area that is a storage area in the storage device 42 for actually storing data) in the second storage apparatus 4 allocated to a VDEV 53 in the first storage apparatus 3. With that configuration, efficient storage area allocation is achieved and the data area size is efficiently set.

Next, another embodiment of processing for data write in the first storage apparatus 3 in the storage system 1 will be described.

Figure 10:
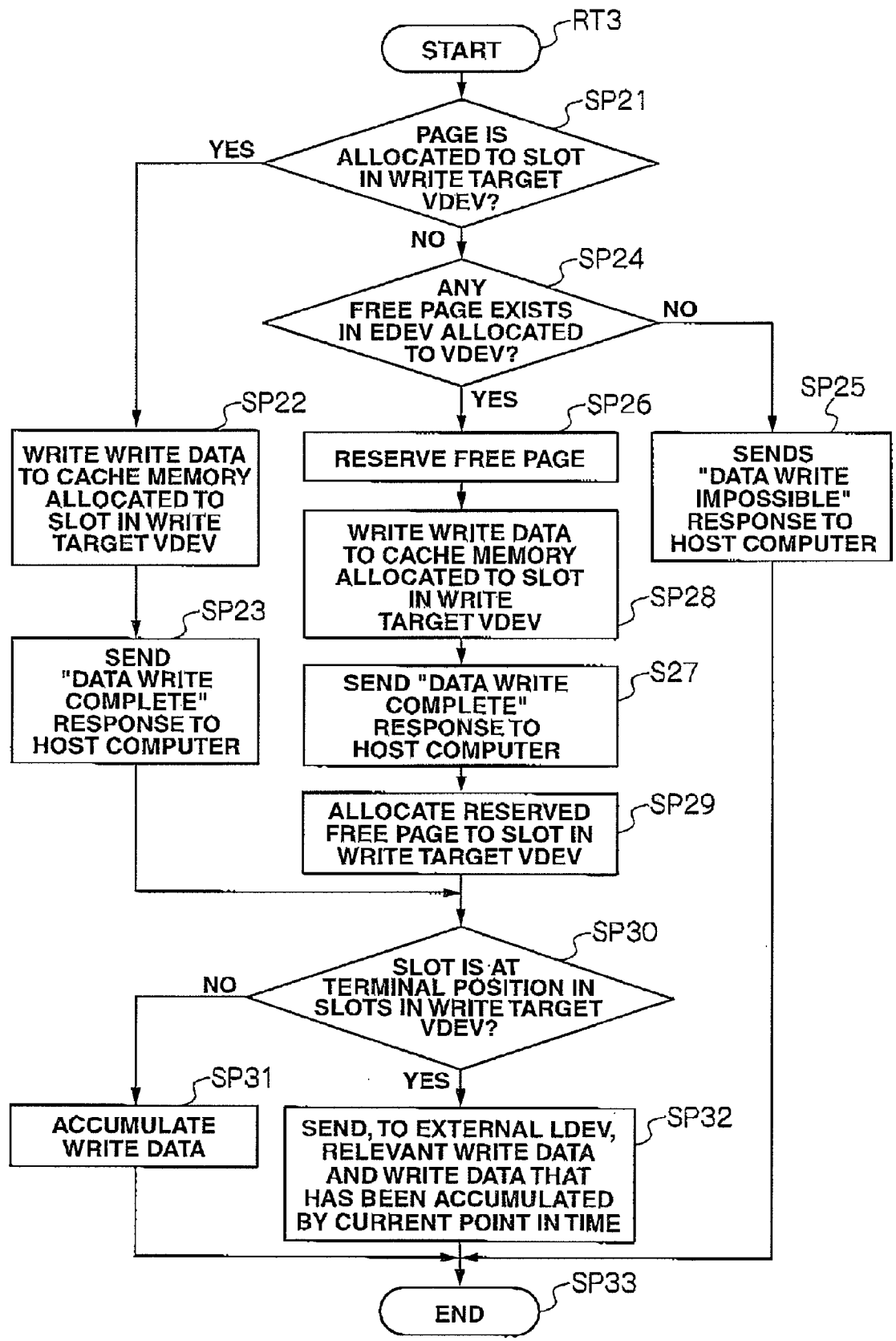
FIG. 10 is a flowchart showing a data write routine.

FIG. 10 is an example of a flowchart showing a specific routine of processing executed by the channel adapter 21 in the first storage apparatus 3 in the storage system 1, regarding data writing in the first storage apparatus 3.

After receiving a write command from, for example, the host computer 2, the channel adapter 21 in the first storage apparatus 3 runs the control program 71 and executes, in accordance with data write routine RT3 shown in FIG. 1C, the same processing as in steps SP11 to SP19 described above (SP21 to SP29).

Next, the channel adapter 21 in the first storage apparatus 3 refers to information about offset positions from the page top in the VDEV management table 72 and checks whether or not a relevant slot (page) in the write target VDEV 53 is at the terminal position (SP30).

If the slot (page) in the write target VDEV 53 is not at the terminal position in the slots (pages) (SP30: NO), the channel adapter 21 in the first storage apparatus 3 accumulates the write data (SP31).

Meanwhile, if the slot (page) in the write target VDEV 53 is at the terminal position in the slots (pages) (SP30: NO), the channel adapter 21 in the first storage apparatus 3 sends the write data and the write data that has been accumulated by current point in time to a relevant external LDEV 51 in the second storage apparatus 4 (SP32). The second storage apparatus 2 then writes the write data to a relevant storage device 42.

Then the channel adapter 21 in the first storage apparatus 3 terminates the data write routine RT3 shown in FIG. 10 (SP33).

With that configuration, in the storage system 1, data that has not been written to an external LDEV 51 is accumulated in the cache memory 24 until the relevant slot comes to the terminal position in the slots (pages) in the write target VDEV 53. When the relevant slot (page) in the write target VDEV 53 reaches the terminal position in the slots (pages), the write data to be written to the slots (pages) in the write target VDEV 53 are collectively sent to that external LDEV 51.

With that configuration, in the storage system 1, the number of times of communication with the second storage apparatus 4 is reduced, and, as already described above, unnecessary, unused area can be effectively prevented from being generated in an external LDEV 51 (an actual storage area that is a storage area in the storage device 42 for actually storing data) in the second storage apparatus 4 allocated to the VDEV 53 in the first storage apparatus 3.

Next, yet another embodiment of processing for data write in the first storage apparatus 3 in the storage system 1 will be described.

Figure 11:
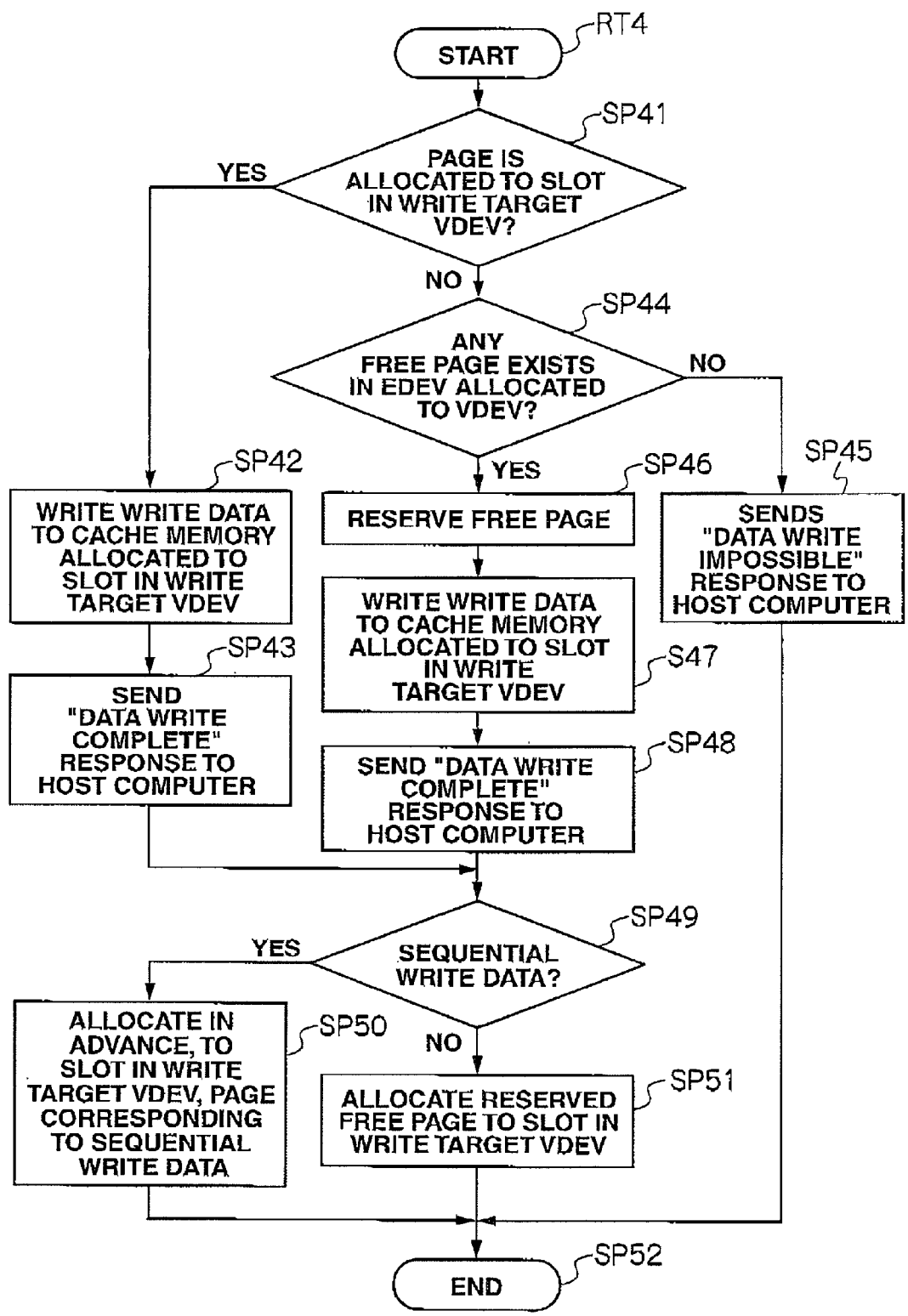
FIG. 11 is a flowchart showing a data write routine.

FIG. 11 is an example of a flowchart showing a specific routine of processing executed by the channel adapter 21 in the first storage apparatus 3, regarding processing for data write in the first storage apparatus 3 in the storage system 1.

After receiving a write command from, for example, the host computer 2, the channel adapter 21 in the first storage apparatus 3 runs the control program 71 and executes, in accordance with the data write routine RT4 shown in FIG. 11, the same processing as in steps SP11 to SP18 described above (SP41~SP48).

After that, the channel adapter 21 in the first storage apparatus 3 checks whether or not relevant write data is sequential write data (SP49).

If the write data is sequential write data (SP49: YES), the channel adapter 21 in the first storage apparatus 3 allocates in advance, to slot in the write target VDEV 53 in the first storage apparatus 3, pages in the EDEV 52 in the storage pool 56 corresponding to the sequential data (SP50).

Meanwhile, if the write data is not sequential data (SP49: NO), the channel adapter 21 in the first storage apparatus 3 allocates the reserved free page to a slot in the write target VDEV 53 (SP51).

Then the channel adapter 21 in the first storage apparatus 3 terminates the data write routine RT4 shown in FIG. 11 (SP52).

In the above described manner, in the storage system 1, if write data is sequential write data, the channel adapter 21 in the first storage apparatus 3 allocates in advance, to slots in the write target VDEV 53 in the first storage apparatus 3, pages in the EDEV 52 in the storage pool 56 corresponding to the sequential data.

If sequential write data that has been sequentially read were written to random positions in the storage area, read performance in the storage system 1 would deteriorate. Therefore, in the above described system, deterioration in read performance is effectively prevented by checking whether the write data is read sequentially or at random and allocating a page in an EDEV 52 in the storage pool 56. In addition, as already described above, in the storage system 1, unnecessary, unused area can be effectively prevented from being generated in an external LDEV 51 (an actual storage area that is a storage area in the storage device 42 for actually storing data) in the second storage apparatus 4 allocated to a VDEV 53 in the first storage apparatus 3.

The invention can be widely utilized in storage systems having a feature of dynamically allocating storage areas in a volume for storing data.

While the invention has been described with respect to a limited number of embodiments those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A storage apparatus for providing a host computer with a data write area where write data is written, the write area being a first dynamically allocated storage area volume that can be dynamically expanded by allocating a logical volume to the first dynamically allocated storage area volume, the apparatus comprising:

a management unit for managing mapping, to the logical volume, of a second dynamically allocated storage area volume in an external storage apparatus, and also managing a management unit for a storage area in the second dynamically allocated storage area volume for storing data sent from the host computer;

a first dynamically allocated storage area volume creation unit for creating, when creating the first dynamically allocated storage area volume in accordance with an externally given command, the first dynamically allocated storage area volume by setting a management unit for the first dynamically allocated storage area volume based on a management unit for a storage area in the second dynamically allocated storage area volume; and a write data writing unit for writing, in accordance with a command from the host computer, the write data sent from the host computer to a storage area in a relevant second dynamically allocated storage area volume.

2. The storage apparatus according to claim 1, wherein the first dynamically allocated storage area volume creation unit presents one or more management units for a storage area in the second dynamically allocated storage area volume and one or more management units values by which the management units for a storage area in the second dynamically allocated storage area volume are divisible respectively, sets an externally selected management unit as the management unit for a storage area in the first dynamically allocated storage area volume, and creates the first dynamically allocated storage area volume.

3. The storage apparatus according to claim 2, wherein if a storage area in the second dynamically allocated storage area volume is not allocated to an area of a management unit for a write target first dynamically allocated storage area volume, the write data writing unit allocates a storage area in the second dynamically allocated storage area volume to an area of the management unit for the write target first dynamically allocated storage area volume, and writes the write data to that storage area.

4. The storage apparatus according to claim 1, wherein if an area of a management unit for a write target first dynamically allocated storage area volume is not at a terminal position in areas of the management unit, the write data writing unit accumulates the write data; and if an area of a management unit for a write target first dynamically allocated storage area volume is at a terminal position in areas of the management unit, the write data writing unit writes the write data and write data that has been accumulated by current point in time to a storage area in the second dynamically allocated storage area volume.

5. The storage apparatus according to claim 1, wherein if the write data is sequential write data, the write data writing unit allocates in advance, to an area of a management unit for a write target first dynamically allocated storage area volume, a storage area in the second dynamically allocated storage area volume corresponding to the sequential write data, and writes the sequential write data to the allocated storage area.

6. A data writing method for a storage apparatus that provides a host computer with a data write area where write data is written, the data write area being a first dynamically allocated storage area volume that can be dynamically expanded by allocating a logical volume to the first dynamically allocated storage area volume, the method comprising:

a first step of managing mapping, to the logical volume, of a second dynamically allocated storage area volume in an external storage apparatus, and also managing a management unit for a storage area in the second dynamically allocated storage area volume for storing data sent from a host computer;

a second step of creating, when creating the first dynamically allocated storage area volume in accordance with an externally given command, the first dynamically allocated storage area volume by setting a management unit for the first dynamically allocated storage area volume based on a management unit for a storage area in the second dynamically allocated storage area volume; and a third step of writing, in accordance with a command from the host computer, the write data sent from the host computer to a storage area in a relevant second dynamically allocated storage area volume.

7. The data writing method according to claim 6, wherein in the second step, one or more management units for a storage area in the second dynamically allocated storage area volume and one or more management unit values by which the management units for a storage area in the second dynamically allocated storage area volume are divisible respectively are presented; an externally selected management unit is set as the management unit for a storage area in the first dynamically allocated storage area volume; and the first dynamically allocated storage area volume is created.

8. The data writing method according to claim 7, wherein in the third step, if a storage area in the second dynamically allocated storage area volume is not allocated to an area of a management unit for a write target first dynamically allocated storage area volume, a storage area in the second dynamically allocated storage area volume is allocated to an area of the management unit for the write target first dynamically allocated storage area volume, and the write data is written to that storage area.

9. The data writing method according to claim 6, wherein in the third step, if an area of a management unit for a write target first dynamically allocated storage area volume is not at a terminal position in areas of the management unit, the write data is accumulated; and if an area of a management unit for a write target first dynamically allocated storage area volume is at a terminal position in areas of the management unit, the write data and write data that has been accumulated by current point in time are written to a storage area in the second dynamically allocated storage area volume.

10. The data writing method according to claim 6, wherein in the third step, if the write data is sequential write data, a storage area in the second dynamically allocated storage area volume corresponding to the sequential write data is allocated in advance to an area of a management unit for a write target first dynamically allocated storage area volume, and the sequential write data is written to the allocated storage area.

* * * * *